United States Patent [19]

Benoit

[11] Patent Number: 5,926,921
[45] Date of Patent: Jul. 27, 1999

[54] CABLE TIE HAVING A STUD MOUNTABLE FASTENER

[75] Inventor: James C. Benoit, Needham, Mass.

[73] Assignee: Avery Dennison Corporation, Pasadena, Calif.

[21] Appl. No.: 08/902,881

[22] Filed: Jul. 30, 1997

[51] Int. Cl.$^6$ .............................. B65D 63/00; F16B 13/00
[52] U.S. Cl. .................. 24/16 PB; 24/17 AP; 24/30.5 P; 248/74.3; 411/437
[58] Field of Search .............................. 24/16 PB, 17 AP, 24/30.5 P; 248/74.3; 411/437

[56] References Cited

U.S. PATENT DOCUMENTS

| | | | |
|---|---|---|---|
| 2,364,668 | 12/1944 | Simmons | 411/437 |
| 4,570,303 | 2/1986 | Richmond et al. | 24/17 AP |
| 4,728,064 | 3/1988 | Caveney | 248/74.3 |
| 4,728,236 | 3/1988 | Kraus | 411/437 |
| 4,784,358 | 11/1988 | Kohut | 248/74.3 |
| 5,154,376 | 10/1992 | Baum et al. | 248/74.3 |
| 5,598,994 | 2/1997 | Olewinski et al. | 248/74.3 |
| 5,645,282 | 7/1997 | Belter | 411/437 |

*Primary Examiner*—Victor N. Sakran
*Attorney, Agent, or Firm*—Kriegsman & Kriegsman

[57] ABSTRACT

A one-piece cable tie for securing a cable to a mounting surface having a threaded stud attached thereto, the cable having an outer sheath of convoluted tubing. The cable tie comprises an elongated strap and a locking head on one end of the strap. The locking head is adapted to cooperate with the strap to form a loop around the cable. The cable tie further includes a fastener coupled to the locking head for securing the cable to the threaded stud. The fastener includes a boss having a central bore to enable the boss to be mounted over the threaded stud. The fastener also includes a first set of flexible fingers formed on the boss which are disposed to project into the bore. Each finger comprises an arm pivotally connected to the boss and an engagement head formed on the arm for engaging the threaded stud. The fastener further includes a cover connected to the boss. The cover is constructed so that at least a portion thereof will breakaway from the boss in order to accommodate threaded studs of a length greater than the length of the boss. In one embodiment, a portion of the cover is broken away so as to form a second set of fingers which are formed on the boss and which engage the threaded stud. The first and second set of fingers engage the threaded stud at different points along its length, thereby increasing the amount of force required to extract the fastener from the stud and thereby better stabilizing the fastener on the stud. The cable tie also includes a rib formed on the locking head to engage a cable which is small in size in order to prevent movement of the cable tie relative to the cable and a rib formed on the fastener to engage a cable which is large in size in order to prevent movement of the cable tie relative to the cable.

12 Claims, 10 Drawing Sheets

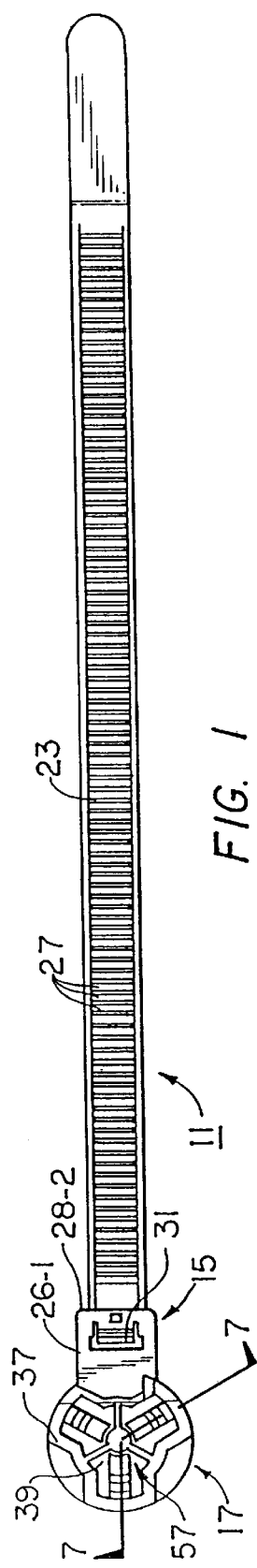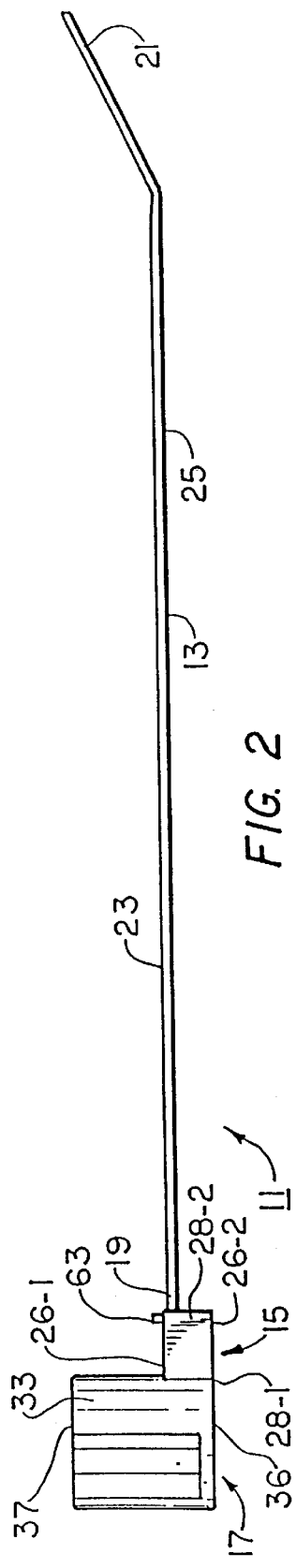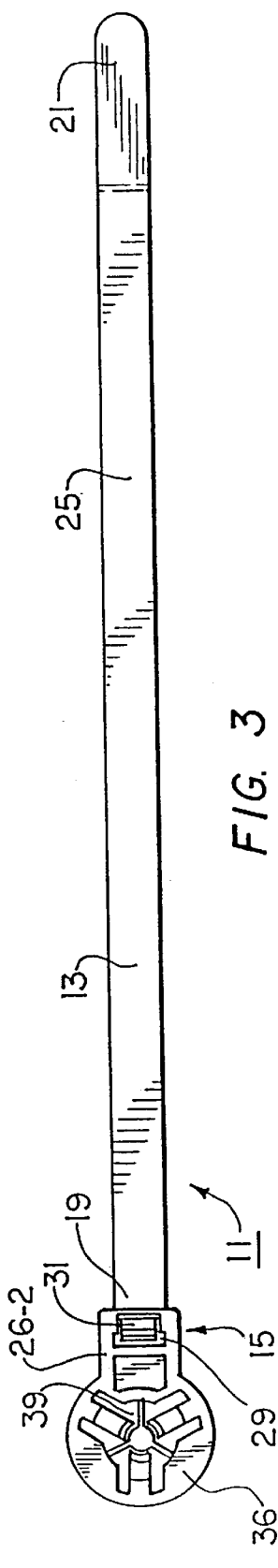

CABLE TIE HAVING A STUD MOUNTABLE FASTENER

BACKGROUND OF THE INVENTION

The present invention relates generally to cable ties, and more specifically to a cable tie which includes a stud mountable fastener for securing the cable tie to a threaded stud welded on a mounting surface, the threaded stud often being referred to as a weld stud.

Cable ties having a stud mountable fastener are well known in the art and are commonly used, for example, for securing a cable to a threaded stud welded onto a panel of a vehicle. Such cables usually comprise one or more wires inside a sheath. Cable ties of this type are also used to secure objects such as wires together to form a bundle and then secure the bundle to the threaded stud.

In U.S. Pat. No. 5,154,376 to H. O. Baum, there is disclosed a cable-securing device of the kind comprising a locking head having a flexible strap extending therefrom and with which in use cables and the like are secured in a loop formed by securing the free end of the strap in the locking head. The locking head includes a short, tubular body which is provided with internal projections. In operation, the fastener of the invention is adapted to clip on to a mounting projection such as the head of a stud by pressing the tubular body over the mounting projection where it is retained by the projections.

In U.S. Pat. No. 4,728,064 to J. E. Caveney, there is disclosed a releasable cable tie for releasably securing discrete elongate objects together to form a bundle and for securing the bundle to a mounting surface. The cable tie comprises a stud mount boss for securing the cable tie to a stud having a distal collar or to a threaded stud, bolt or the like. The stud mount boss includes a cylindrical socket having a formed stud mount bore. Three resilient fingers and three guidance ribs are formed within the bore. The resilient fingers project upwardly from a stud entry face towards a stud exit face of the socket forming a 45 degree angle with the centerline of the socket.

One drawback of cable ties having stud mounting means of the type described above is that such stud mounting means can only be secured onto studs of a particular diameter and of a particular length, which significantly narrows the range of potential applications of the cable tie. In particular, such a stud mounting means can only be used in conjunction with studs of a diameter which can fit within the stud mount boss and studs of a length which will not project past the stud exit face of the socket.

Another drawback of cable ties having stud mounting means of the type described above is that such stud mounting means typically include a plurality of fingers which engage a stud at only one point along its length. Because the fingers engage the stud at only one point along its length, the stud mounting means is not mounted stably on the stud and therefore may experience wobbling, which is undesirable.

Other references of interest include U.S. Pat. No. 5,333,822 to J. C. Benoit et al; U.S. Pat. No. 4,860,979 to G. I. Camenisch; U.S. Pat. No. 4,784,358 to J. K. Kohut; and U.S. Pat. No. 4,781,504 to K. Yuta.

SUMMARY OF THE INVENTION

It is an object of this invention to provide a new and improved cable tie.

It is another object of this invention to provide a cable tie as described above for use in securing a cable to a mounting surface.

It is yet another object of this invention to provide a cable tie of the type described above which includes a fastener adapted to engage a threaded stud which is secured to a mounting surface.

It is still another object of this invention to provide a cable tie of the type described above which includes a fastener adapted to engage a wide range of different sized threaded studs.

It is yet still another object of this invention to provide a cable tie of the type described above which enables the cable to sit securely against the mounting surface.

It is another object of this invention to provide a cable tie of the type described above in which the fastener is adapted to engage the threaded stud with a relatively low force of insertion and a relatively high force of extraction.

It is still another object of this invention to provide a cable tie of the type described above in which the fastener experiences a limited amount of wobbling when mounted on the threaded stud.

It is yet another object of this invention to provide a cable tie of the type described above which has a one-piece construction and is economical and simple to manufacture.

Accordingly, there is provided a cable tie for securing a cable to a mounting surface having a threaded stud attached thereto, said cable tie comprising an elongated strap having a first end and a second end, a locking head integrally formed on the first end of said elongated strap, said locking head being adapted to cooperate with said strap to form a loop around the cable, and a fastener coupled to said locking head for securing said cable to the threaded stud on the mounting surface, said fastener including a boss having a stud entry face, a stud exit face and a central bore, said central bore being sized and shaped so as to enable the threaded stud to extend therein.

As one feature of the present invention, said fastener further includes a plurality of flexible fingers formed on said boss, said fingers being disposed to project into said bore, each finger comprising an arm pivotally connected to said boss and an engagement head formed on said arm for engaging the threaded stud.

As another feature of the present invention, said fastener further includes a cover connected to the stud exit face of said boss, said cover being constructed so that at least a portion thereof will breakaway from said boss to accommodate threaded studs of a length longer than the length of the boss.

As yet another feature of the present invention, said locking head further comprises a first rib on the locking head for preventing movement of the cable relative to the strap when said strap is wrapped around a cable which is small in size (i.e. diameter) and a second rib on said boss for preventing movement of the cable relative to the strap when said strap is wrapped around a cable which is large in size.

In another embodiment of the present invention, a cable tie for securing a cable to a mounting surface having a threaded stud attached thereto, said cable tie comprising an elongated strap having a first end and a second end, a locking head integrally formed on the first end of said elongated strap, said locking head being adapted to cooperate with said strap to form a loop around the cable, and a fastener coupled to said locking head for securing said cable to the mounting surface, said fastener comprising a boss having a stud entry face, a stud exit face and a central bore, said central bore being sized and shaped so as to enable the threaded stud to extend therethrough, a first set of fingers formed on said boss, said fingers being disposed to project into said bore and engage the threaded stud at a first point along its length, and a second set of fingers formed on said boss, said fingers being disposed to project into said bore and engage the threaded stud at a second point along its length.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 1 is a top view of a first embodiment of a cable tie constructed according to the teachings of the present invention;

FIG. 2 is a side view of the cable tie shown in FIG. 1;

FIG. 3 is a bottom view of the cable tie shown in FIG. 1;

DETAILED DESCRIPTION OF THE PREFERRED EMBODIMENT

Figure 4:
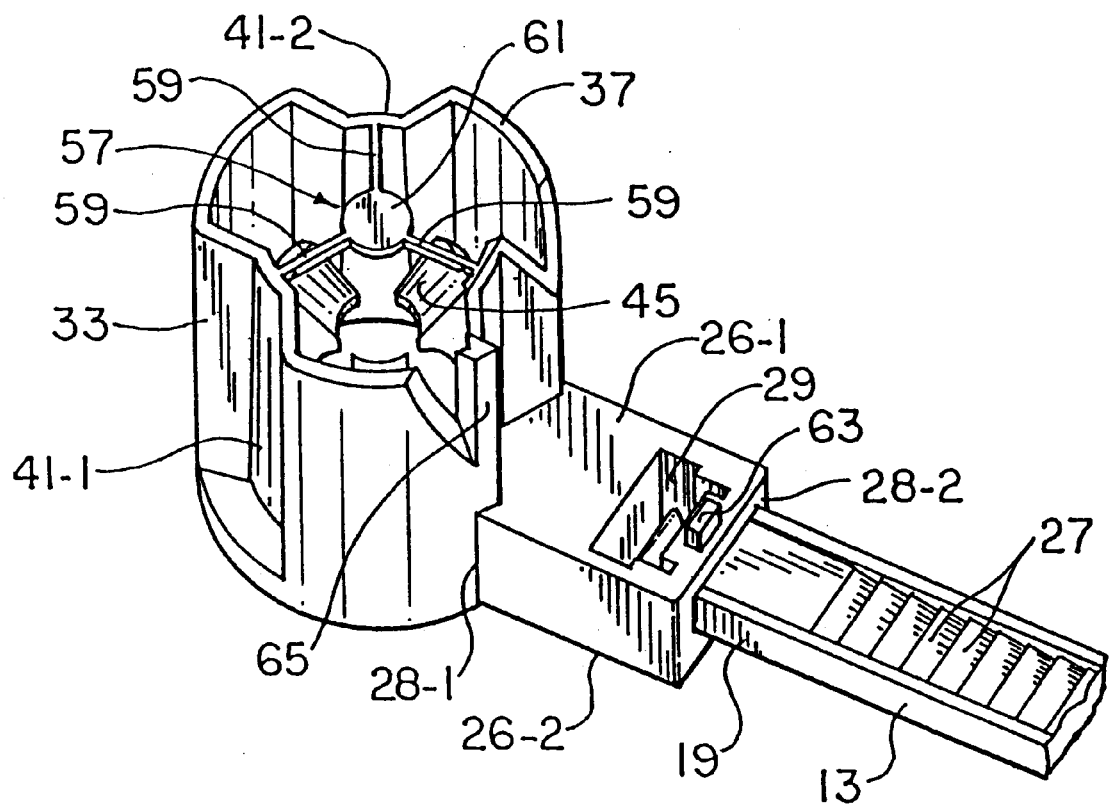
FIG. 4 is an enlarged, fragmentary perspective view of the cable tie shown in FIG. 1.

Referring now to FIGS. 1–11, wherein like numerals indicate like elements, there is shown a first embodiment of a cable tie constructed in accordance with the principles of the present invention, the cable tie being identified by reference numeral 11.

Cable tie 11 is an integrally formed structure made of a flexible, resilient material such as plastic, nylon or a high modulus elastomer and can be manufactured through conventional injection molding techniques. If cable tie 11 is to be used in high temperature applications, cable tie 11 may be made of a plastic which is able to withstand high temperatures, such as stanyl.

Cable tie 11 comprises an elongated strap 13, a locking head 15 and a fastener 17.

Elongated strap 13 includes a first end 19, a second end 21, a top surface 23 and a bottom surface 25. Strap 13 further includes a plurality of ratchet-shaped teeth 27 spaced along the length of top surface 23.

Locking head 15 includes a top surface 26-1, a bottom surface 26-2, an outer end wall 28-1, an inner end wall 28-2 and a strap accepting channel 29 which extends through head 15 from top surface 26-1 to bottom surface 26-2. Inner end wall 28-2 of locking head 15 is integrally formed on first end 19 of elongated strap 13.

Tie 11 is used to secure a cable onto a threaded stud welded onto a panel in the following manner. Second end 21 of strap 13 is wrapped around the cable and is inserted through strap accepting channel 29 to form a loop. Second end 21 is further advanced through strap accepting channel 29 to reduce the size of the loop, drawing strap 13 tight around the cable. As second end 21 is fed through strap accepting channel 29, a locking pawl 31 within head 15 engages the individual ratchet teeth 27 on strap 13 to prevent extraction of strap 13 from strap accepting channel 29. Fastener 17 is then slidably mounted on the threaded stud to secure the cable to the panel.

Figure 5:
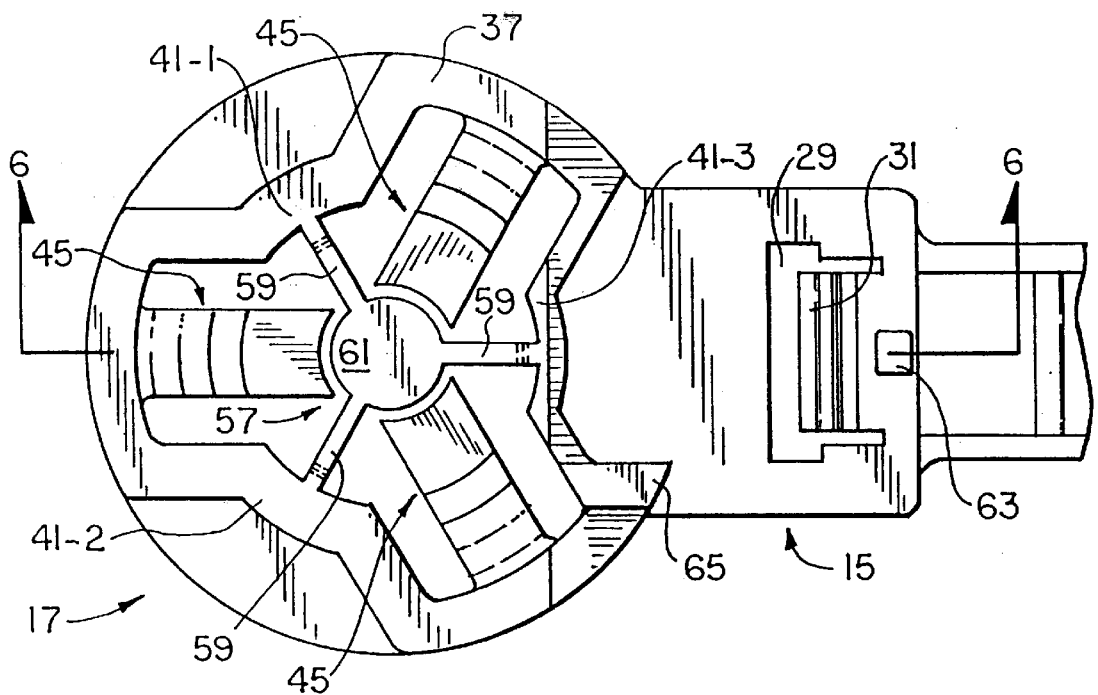
FIG. 5 is an enlarged, fragmentary top view of the cable tie shown in FIG. 1.
Figure 6:
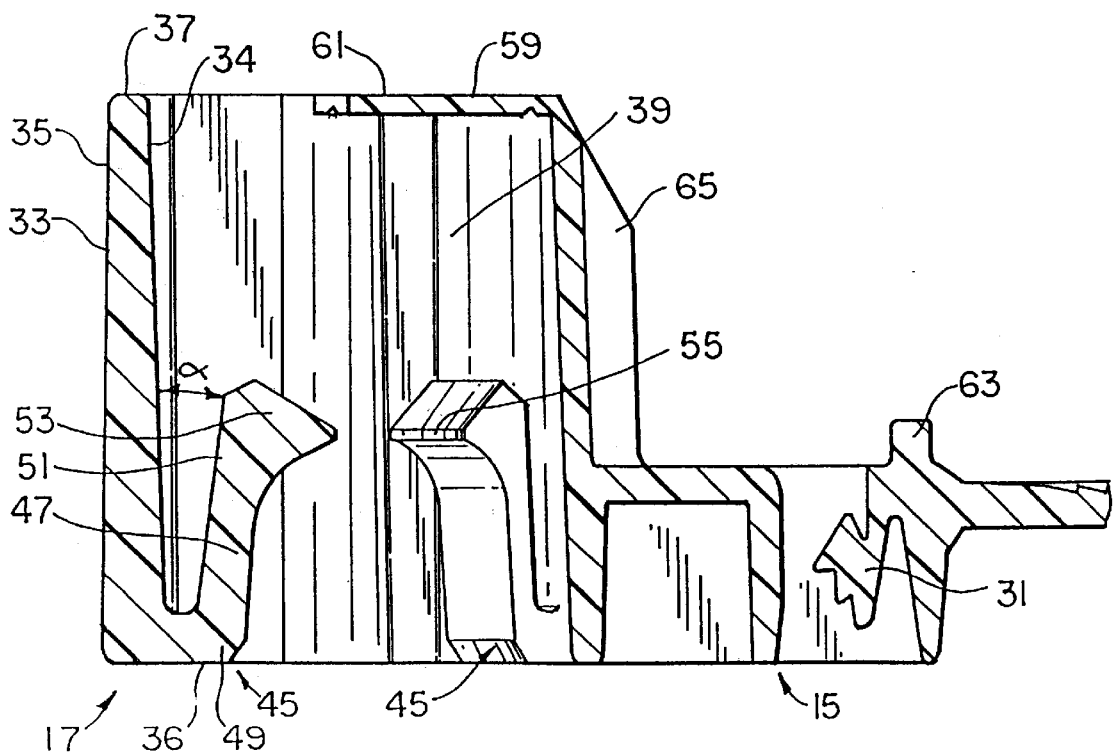
FIG. 6 is a fragmentary, sectional view of the cable tie shown in FIG. 5 taken along lines 6—6.

Referring now to FIGS. 4–6, fastener 17 is integrally formed on outer end wall 28-1 of locking head 15 and is disposed perpendicular to the longitudinal axis of strap 13. Fastener 17 comprises a generally cylindrical stud mountable boss 33 integrally formed on outer end wall 28-1 of locking head 15. Boss 33 includes an inner surface 34, an outer surface 35, a stud entry face 36, a stud exit face 37 and a central bore 39. Boss 33 is shaped to include three concave portions 41-1, 41-2 and 41-3 which are spaced equally around the circumference of boss 33 and which serve as finger gripping grooves to assist the user in mounting boss 33 onto a threaded stud. In addition, concave portions 41-1, 41-2 and 41-3 define the maximum diameter of a stud that can be inserted through central bore 39.

Fastener 17 further includes a plurality of resilient, flexible fingers 45 which are integrally formed on boss 33 at the juncture of inner surface 34 and stud entry face 36. Fingers 45 are equally spaced around the circumference of central bore 39 and project radially inward to engage the individual ridges in the threaded stud.

Each of fingers 45 comprises an elongated, resilient arm 47 having a first end 49 and a second end 51. First end 49 of arm 47 is pivotally connected to boss 33 at the juncture of inner surface 34 and stud entry face 36. Arm 47 is biased so as to extend into central bore 39 at an angle a of approximately 10 degrees from inner surface 34 of boss 33. The pivotal connection of arm 47 to boss 33 enables arm 47 to flex out towards inner surface 34 to accommodate thicker studs, thereby increasing the range of stud sizes with which tie 11 may be used.

Second end 51 of arm 47 extends into central bore 39 to the approximate half way point between entry face 36 and exit face 37. An engagement head 53 is integrally formed on arm 47 at second end 51. Engagement head 53 extends substantially perpendicular from arm 47 into central bore 39 and includes a pointed tip 55 which engages the individual ridges of the stud, thereby securing fastener 17 onto the threaded stud.

The particular pivotal construction of fingers 45 serves to increase its overall flexibility. The increased flexibility of fingers 34 serves to decrease the amount of force required to mount boss 33 over the stud and increase the amount of force required to extract boss 33 from the stud, as is highly desired. Furthermore, the increased flexibility of fingers 45 enables fastener 17 to be removed from the threaded stud without breaking strap 13 or locking head 15. This enables tie 11, with a cable wrapped therewithin, to be removed from a stud, if desired, and then remounted on the same stud or another stud.

Fastener 17 further comprises a cover 57 formed on boss 33 at stud exit face 37. Cover 57 comprises three thin connective legs 59 which are formed on stud exit face 37 of boss 33. Connective legs 59 extend radially inward into bore 39 and terminate into a disc-shaped center member 61. Center member 61 is sized and shaped to serve as a thumb pushing surface for slidably mounting fastener 17 over stud S.

Figure 7:
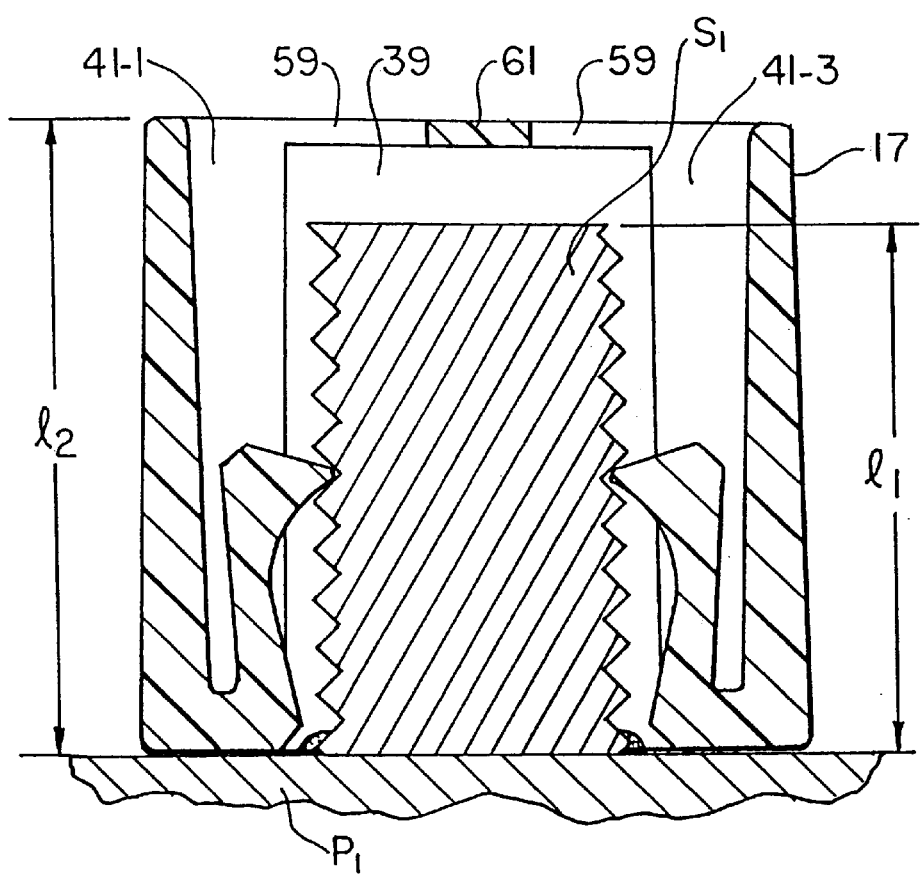
FIG. 7 is a section view, taken along lines 7—7 in FIG. 1, of the fastener in the cable tie shown in FIG. 1, the fastener being shown mounted on a threaded stud having a length less than the length of the boss.
Figure 7A:
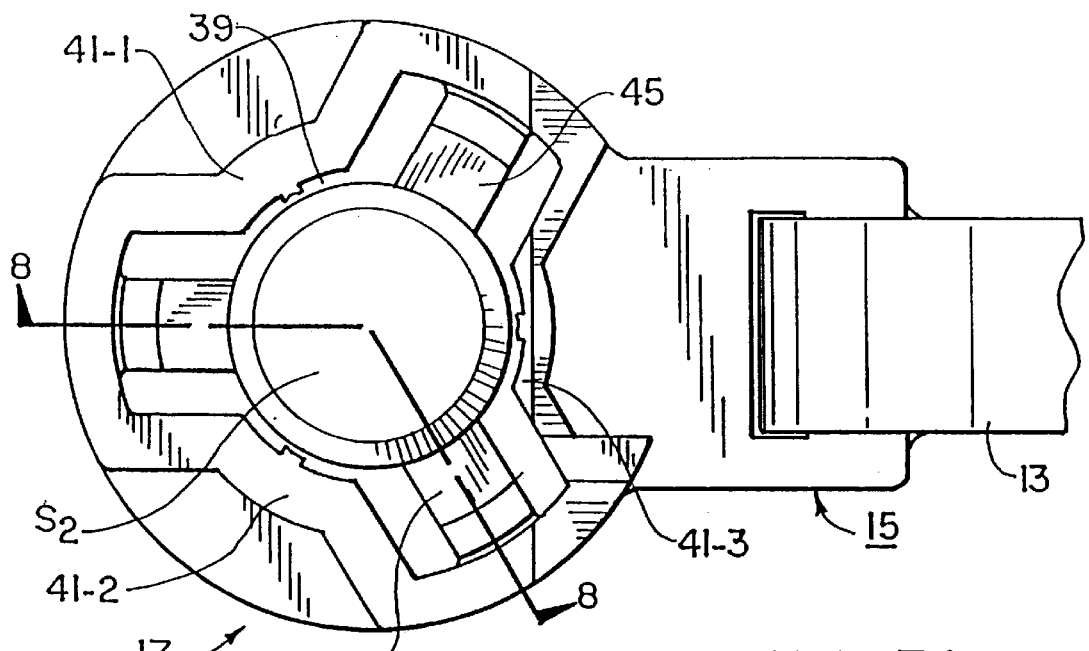
FIG. 7A is an enlarged, fragmentary plan view of the cable tie shown in FIG. 1, the cable tie being shown with the fastener mounted on a threaded stud having a length larger than the length of the boss, the cover of the fastener being broken away from the boss to accommodate the stud, and with the second end of the strap inserted through the strap accepting channel of the locking head.
Figure 8:
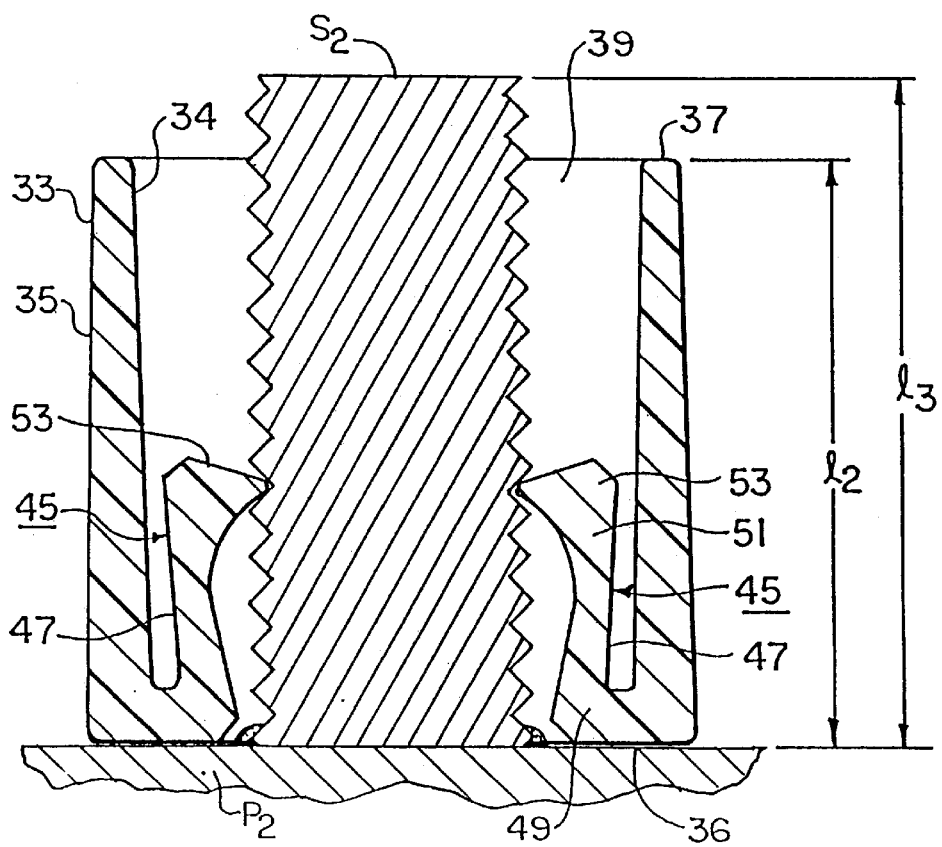
FIG. 8 is a fragmentary sectional view of the cable tie shown in FIG. 7A taken along lines 8—8, the threaded stud being shown welded onto a mounting surface.

Connective legs 59, because of their thin construction, can be easily broken so that at least the center portion of cover 57 can be detached from boss 33 to accommodate studs of a length longer than the length of boss 33, as shown in FIGS. 7A and 8. In this manner, fastener 17 can be mounted on a stud of a length such that boss entry face 36 can sit flatly against the panel to which the stud is attached with the stud extending out through stud exit face 37, thereby reducing the potential for the cable to bounce away from the panel and become damaged.

FIG. 7 shows fastener 17 mounted on a stud $S_1$ welded to a panel $P_1$ in which the length $l_1$ of stud $S_1$ is less than the length $l_2$ of boss 33. FIG. 8 shows fastener 17 mounted on a stud $S_2$ welded to a panel $P_2$ in which the length $l_3$ of stud $S_2$ is greater than the length $l_2$ of boss 33.

Figure 10:
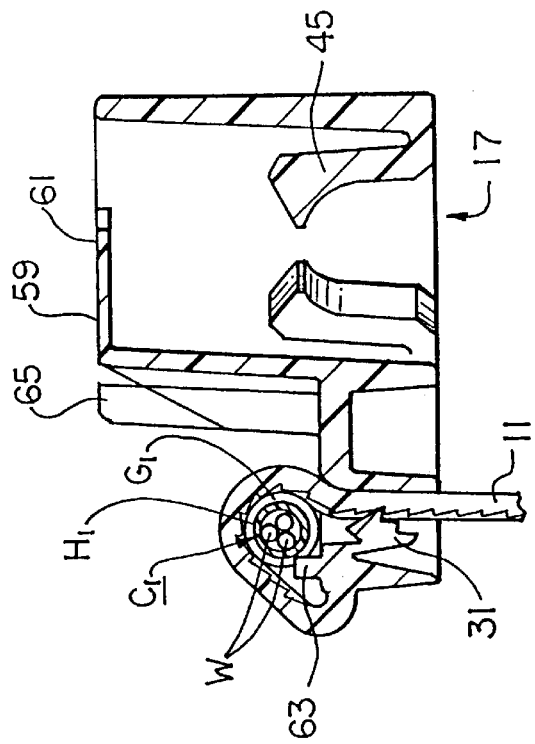
FIG. 10 is an enlarged, fragmentary section view of the cable tie shown in FIG. 2, the cable tie being shown around a cable made up of a plurality of wires which is enclosed within a tubular sheath.
Figure 9:
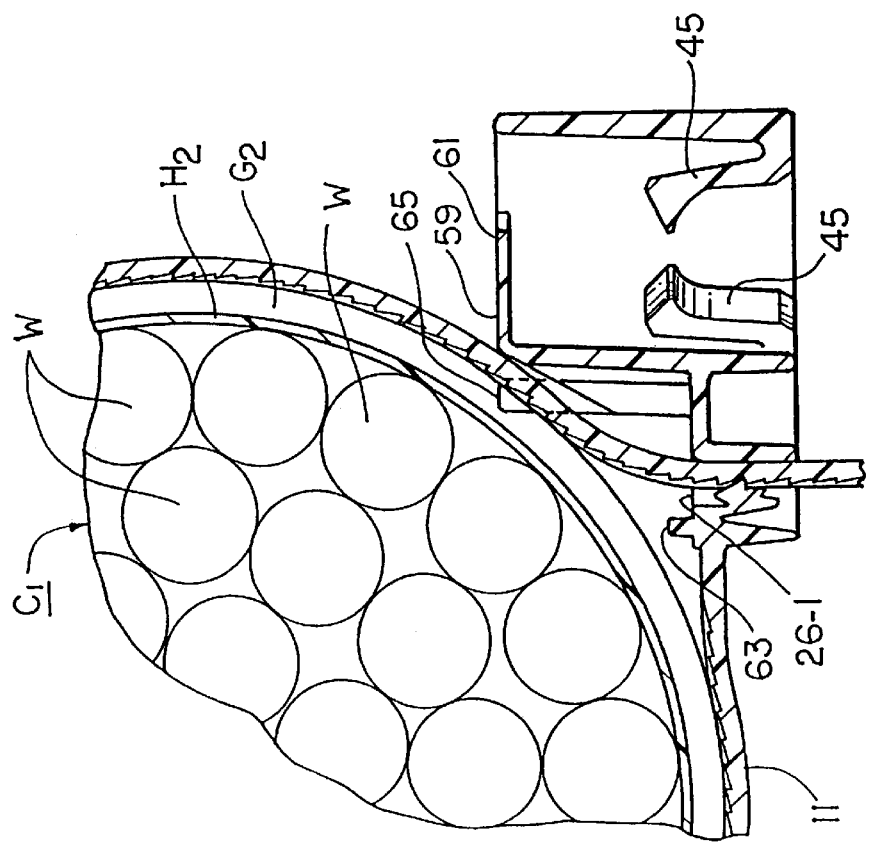
FIG. 9 is an enlarged, fragmentary section view of the cable tie shown in FIG. 2, the cable tie being shown around a cable made up of a plurality of wires enclosed within a tubular sheath.
Figure 11:
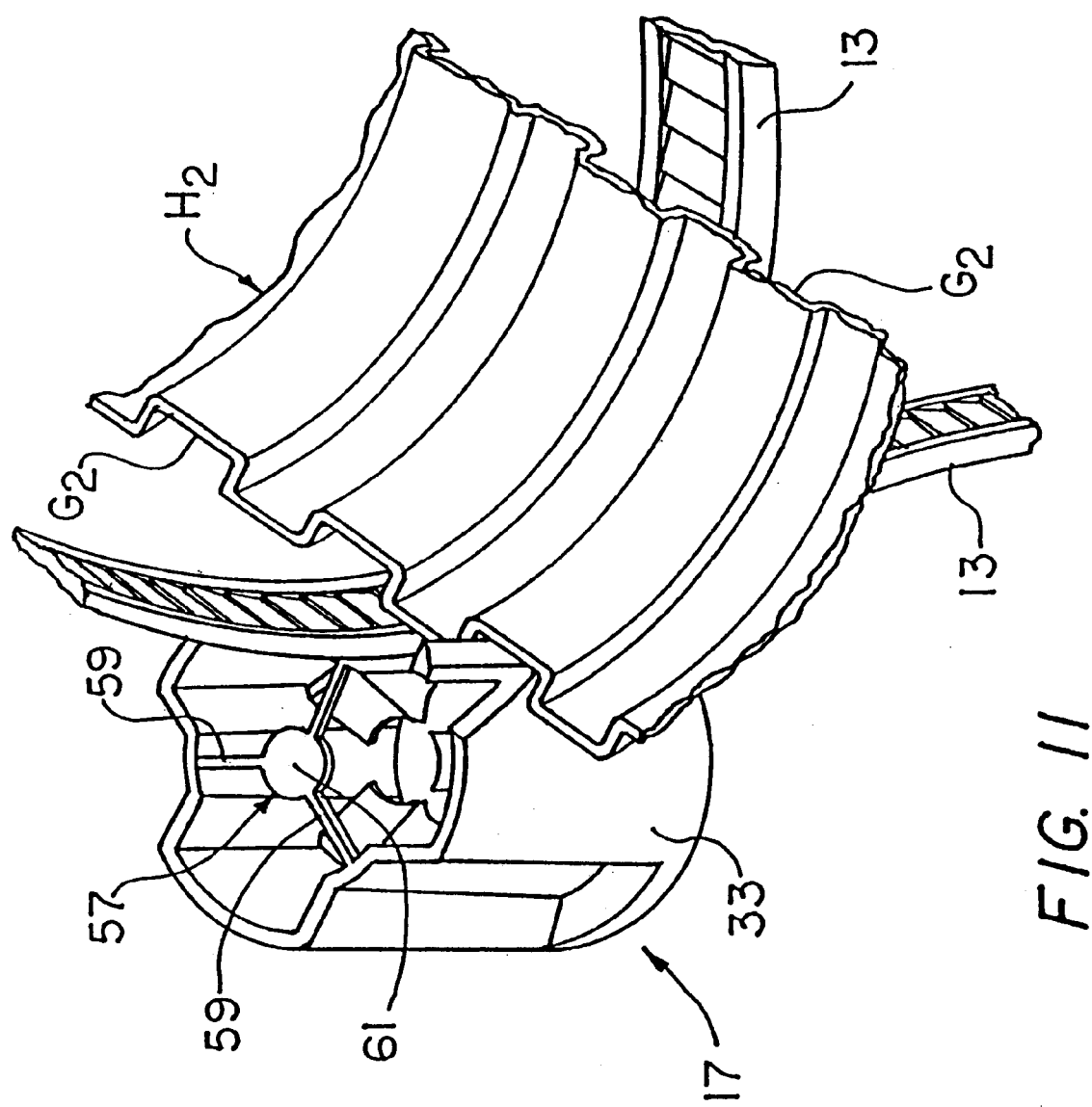
FIG. 11 is fragmentary, perspective view of the cable tie shown in FIG. 9.
Figure 12:
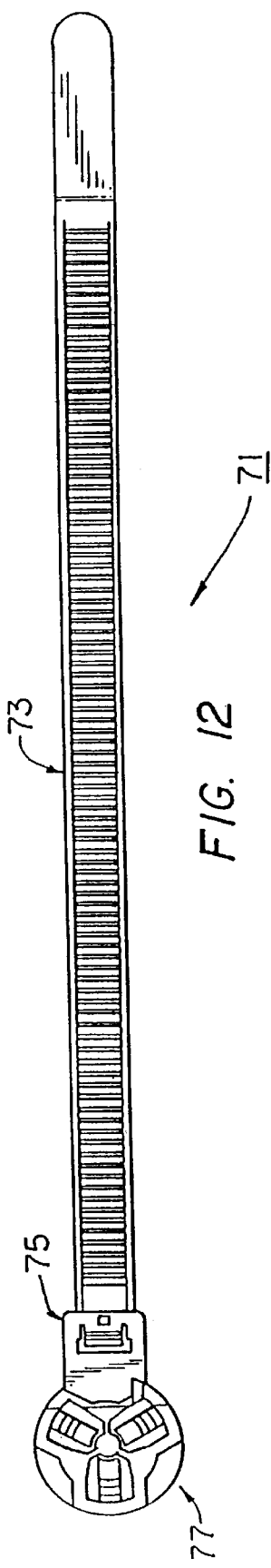
FIG. 12 is a top view of a second embodiment of a cable tie constructed according to the teachings of the present invention.
Figure 13:
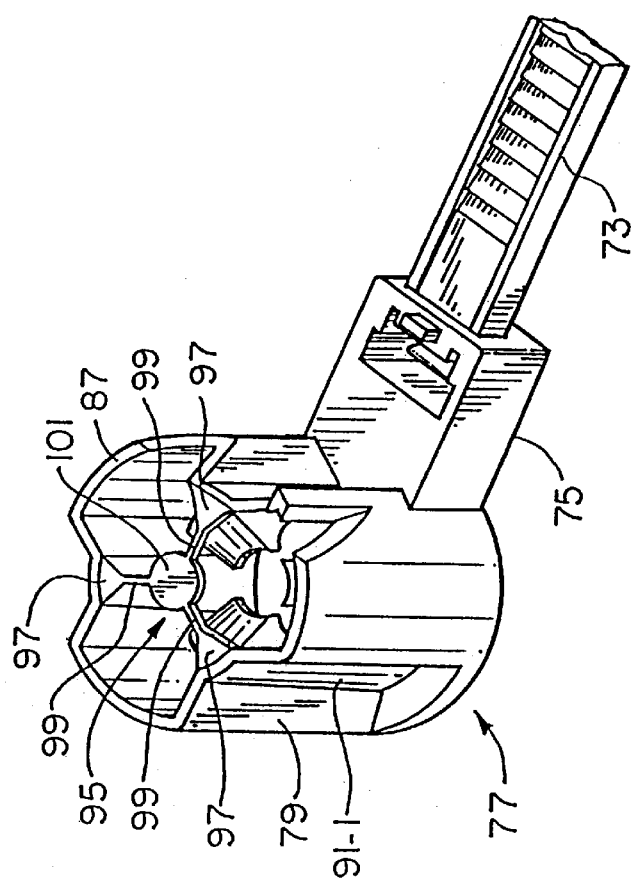
FIG. 13 is an enlarged, fragmentary perspective view of the cable tie shown in FIG. 12.
Figure 14:
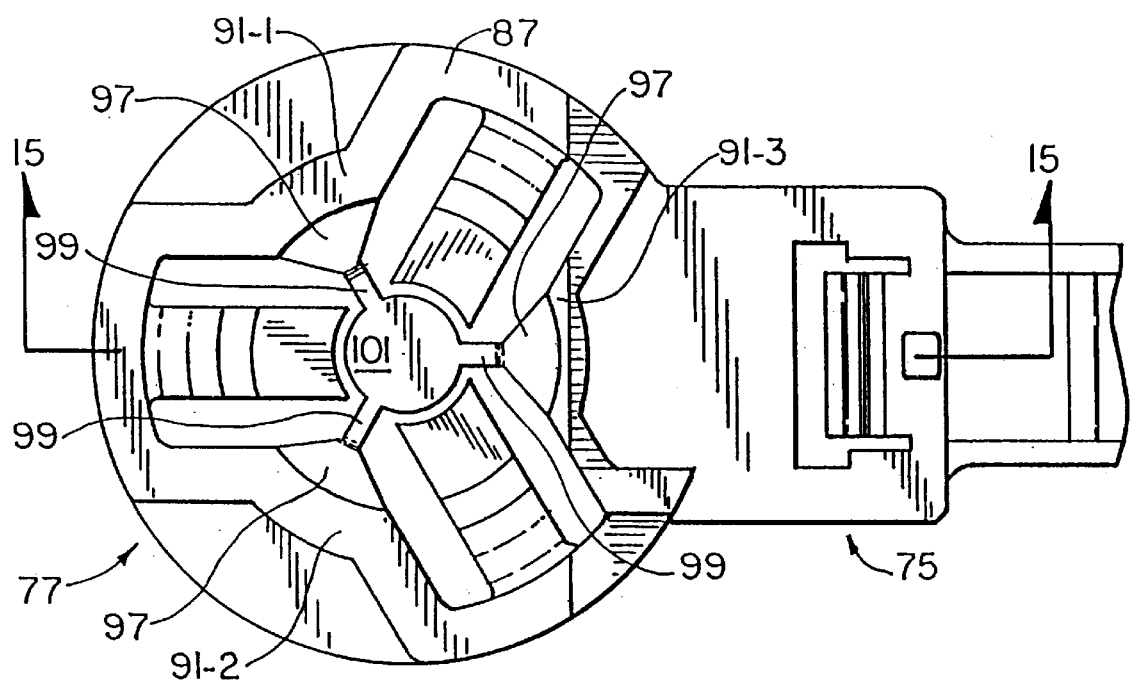
FIG. 14 is an enlarged, fragmentary top view of the cable tie shown in FIG. 12.
Figure 15:
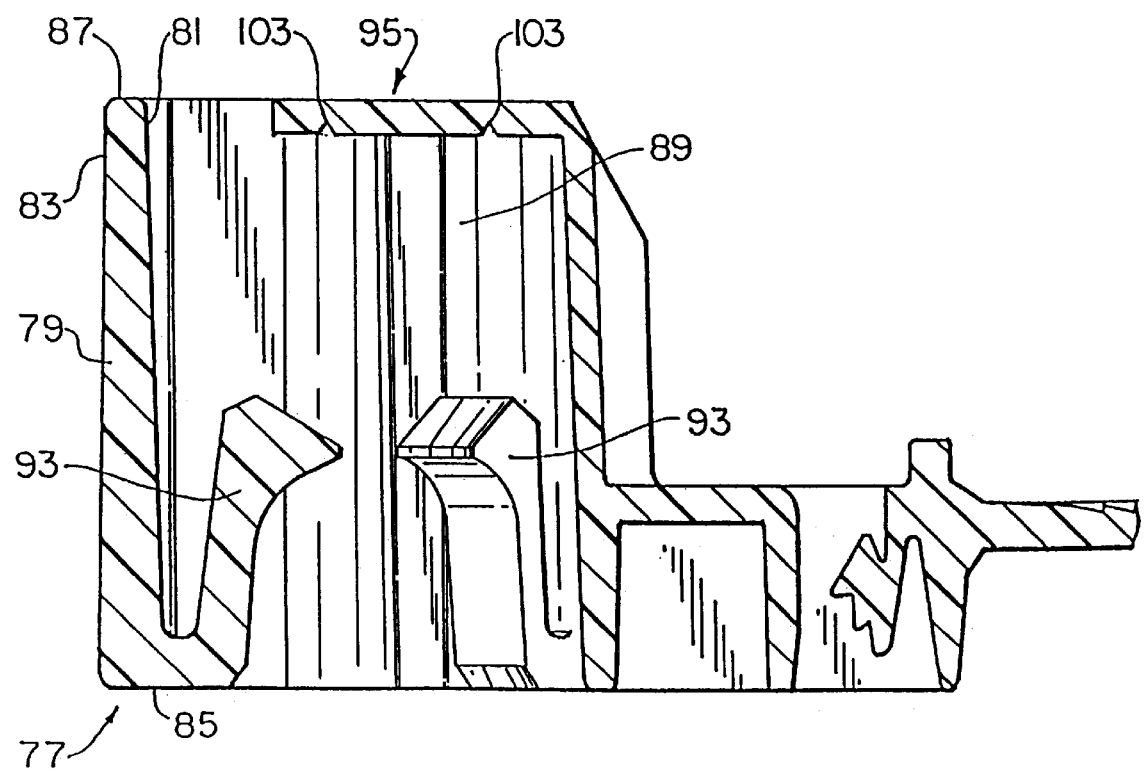
FIG. 15 is a fragmentary, sectional view of the cable tie shown in FIG. 14 taken along lines 15—15.

Referring now to FIGS. 9–11, cable tie 11 further comprises a pair of ribs 63 and 65. Rib 63 is integrally formed on top surface 26-1 of head 15 and engages an annular groove $G_1$ in sheath $H_1$ to preventing tie 11 from sliding along the longitudinal axis of sheath $H_1$. Rib 65 is integrally formed on outer surface 35 of boss 33 at groove 43-3 and engages an annular groove $G_2$ in sheath $H_2$ to prevent tie 11 from sliding along the longitudinal axis of sheath $H_2$. It should be noted that by tightening strap 13 tautly around the sheath of a cable, ribs 63 and 65 also prevent tie 11 from rotating around the longitudinal axis of the sheath.

Instead of the locking head being between the fastener and the strap as shown in FIGS. 1–3, the tie could be constructed so that the fastener is between the head and the strap.

Also, it is to be understood that tie 11 is not exclusively limited to use with a cable made up of a plurality of wires enclosed within a convoluted sheath, but may, if desired, also be used with a plurality of wires not enclosed within a sheath.

Referring now to FIGS. 12–18, there is shown a second embodiment of a cable tie constructed in accordance with the principles of the present invention, the cable tie being identified by reference numeral 71.

Cable tie 71 comprises an elongated strap 73, a locking head 75 and a fastener 77. The construction of elongated strap 73 and locking head 75 of cable tie 71 are identical to the construction of elongated strap 13 and locking head 15, respectively, of cable tie 11. However, the construction of fastener 77 of cable tie 71 differs slightly from the construction of fastener 17 of cable tie 11.

As shown in FIGS. 13–17, fastener 77 comprises a generally cylindrical stud mountable boss 79 which is integrally formed on locking head 75. Stud mountable boss 79 is identical in construction and function to boss 33 of fastener 17. Specifically, boss 79 includes an inner surface 81, an outer surface 83, a stud entry face 85, a stud exit face 87 and a central bore 89. Boss 79 is shaped to include three concave portions 91-1, 91-2 and 91-3 which are spaced equally around the circumference of boss 79 and which serve as finger gripping grooves to assist the user in mounting boss 79 onto a threaded stud.

Fastener 77 comprises a plurality of lower, resilient, flexible fingers 93 which are integrally formed on boss 79. Fingers 93 of fastener 77 are identical in construction and function to fingers 45 of fastener 17. Specifically, fingers 93 of fastener 77 are integrally formed on boss 79 at the juncture of inner surface 81 and stud entry face 85. Fingers 93 are equally spaced around the circumference of central bore 89 and project radially inward to engage the individual ridges of a threaded stud.

Fastener 77 further comprises a cover 95 formed on boss 79 at stud exit face 87. It is the construction and function of cover 95, in comparison with cover 57, which distinguishes fastener 77 from fastener 17.

Cover 95 comprises three, upper, generally trapezoidal fingers 97 which are integrally formed on stud exit face 87 of boss 79. Fingers 97 are equally spaced around the circumference of central bore 89 and project radially inward to engage the individual ridges of a threaded stud. It should be noted that fingers 97 are constructed to be able to flex slightly upward to engage the individual ridges of a threaded stud, as shown in FIG. 17.

Cover 95 further comprises three thin connective legs 99, one connective leg 99 projecting radially inward from each one of fingers 97. Each of the three legs 99 extend radially inward into bore 89 and terminate into a single, disc-shaped center member 101. Center member 101 is sized and shaped to serve as a thumb pushing surface for slidably mounting fastener 77 over a stud.

Figure 16:
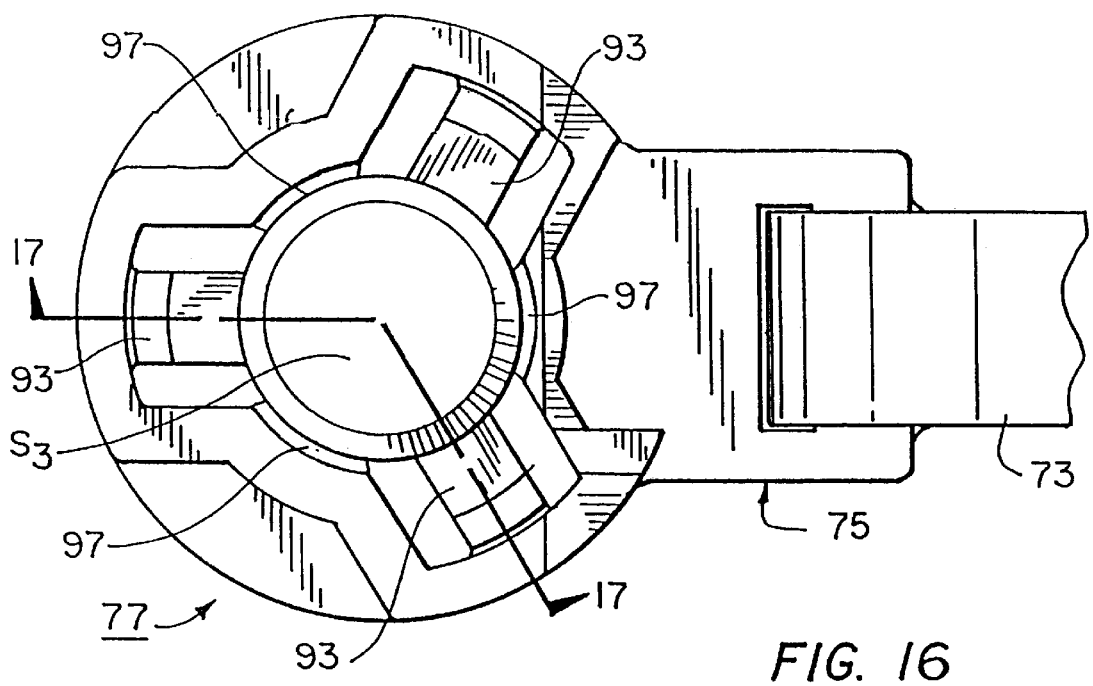
FIG. 16 is an enlarged, fragmentary plan view of the cable tie shown in FIG. 12, the cable tie being shown with the fastener mounted on a threaded stud having a length larger than the length of the boss, the cover of the fastener being broken away from the boss to accommodate the stud, and with the second end of the strap inserted through the strap accepting channel of the locking head.

Cover 95 is formed on also include three notches 103, one notch 103 being formed at the approximate junction of each finger 97 with its associated connective leg 99. In use, in order for fastener 77 to accommodate a stud S3 having a length longer than the length of boss 79 (as shown in FIGS. 16 and 17), center member 101 and connective legs 99 of cover 95 can be broken away from the remainder of fastener 77 through notches 103 and be removed. In this manner, fastener 77 can be mounted on stud S3 such that boss entry face 85 can sit flatly against the panel P3 to which stud S3 is attached, with stud S3 extending out through stud exit face 87 to thereby reducing the potential for the cable to bounce away from the panel and become damaged.

Figure 17:
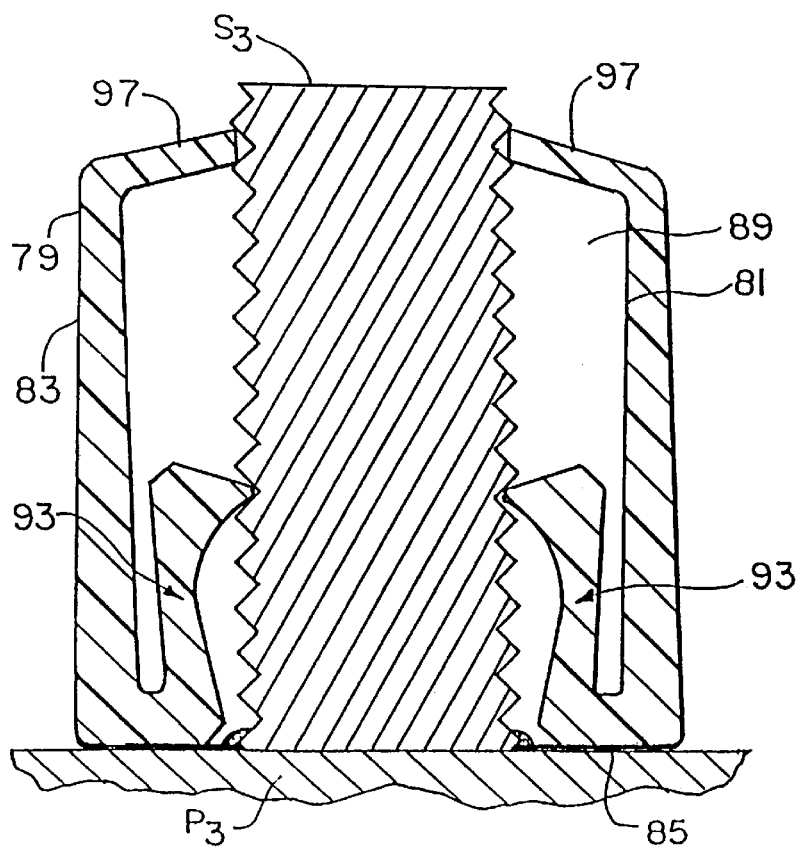
FIG. 17 is a fragmentary sectional view of the cable tie shown in FIG. 16 taken along lines 17—17, the threaded stud being shown welded onto a mounting surface.

As shown in FIG. 17, fastener 77 differs from fastener 17 in that both lower fingers 93 as well as upper fingers 97 engage the threadings in stud S3 to ensure that fastener 77 remains mounted on stud S3 and can not be removed. As can be appreciated, the use of both lower fingers 93 and upper fingers 97 increases the strength of fastener 77 and makes the removal of fastener 77 from stud S3 more difficult. Furthermore, the location of lower fingers 93 and upper fingers 97 at opposite faces of fastener 77 causes each set of fingers to engage threaded stud S3 at different points along its length. As a result, the stability of fastener 77 on stud S3 is increased and the potential of fastener 77 wobbling on stud S3 is thereby decreased.

It should be known that the features of cable tie 11 and cable tie 71 are not exclusive and could be readily interchanged to create additional embodiments. For example, cover 57 of cable tie 11 could be replaced with cover 95 of cable tie 71 without departing from the spirit of the present invention.

The embodiments shown in the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A cable tie for securing a cable to a mounting surface having a threaded stud attached thereto, said cable tie comprising:
   (a). an elongated strap having a first end and a second end,
   (b). a locking head integrally formed on the first end of said elongated strap, said locking head being adapted to cooperate with said strap to form a loop around the cable, and
   (c). a fastener coupled to said locking head for securing said cable to the mounting surface, said fastener comprising:
      i. a boss having a stud entry face, a stud exit face, an inner surface and a central bore, said central bore being sized and shaped so as to enable the threaded stud to extend therethrough, and
      ii. a first set of fingers formed on said boss at the juncture of said inner surface and said stud entry face, said first set of fingers being disposed to project into said bore and engage the threaded stud at a first point along its length, and
      iii. a second set of fingers formed on said boss at said stud exit face, said second set of fingers being disposed to project into said bore and engage the threaded stud at a second point along its length, said first set of fingers being disposed below said second set of fingers.

2. A cable tie for securing a cable to a mounting surface having a threaded stud attached thereto, said cable tie comprising:
   (a). an elongated strap having a first end and a second end,
   (b). a locking head integrally formed on the first end of said elongated strap, said locking head being adapted to cooperate with said strap to form a loop around the cable, and
   (c). a fastener coupled to said locking head for securing said cable to the mounting surface, said fastener comprising:
      i. a boss having a stud entry face, a stud exit face, an inner surface and a central bore, said central bore being sized and shaped so as to enable the threaded stud to extend therethrough,
      ii. a first set of fingers formed on said boss at the juncture of said inner surface and said stud entry face, said first set of fingers being disposed to project into said bore and engage the threaded stud at a first point along its length,
      iii. a second set of fingers formed on said boss on said stud exit face, said second set of fingers being disposed to project into said bore and engage the threaded stud at a second point along its length, said first set of fingers being disposed below said second set of fingers,
      iv. a plurality of connective legs, one connective leg projecting radially inward from each one of said second set of fingers, and
      v. a center member connected to each one of said plurality of connective legs.

3. The cable tie as claimed in claim 2 wherein said first set of fingers are equally spaced around the circumference of the central bore.

4. The cable tie as claimed in claim 3 wherein said second set of fingers are equally spaced around the circumference of the central bore.

5. A cable tie for securing a cable to a mounting surface having a threaded stud attached thereto, said cable tie comprising:
   (a). an elongated strap having a first end and a second end,
   (b). a locking head integrally formed on the first end of said elongated strap, said locking head being adapted to cooperate with said strap to form a loop around the cable, and
   (c). a fastener coupled to said locking head for securing said cable to the mounting surface, said fastener comprising:
      i. a boss having a stud entry face, a stud exit face and a central bore, said central bore being sized and shaped so as to enable the threaded stud to extend therethrough,
      ii. a first set of fingers formed on said boss, said fingers being disposed to project into said bore and engage the threaded stud, and
      ii. a cover formed on said boss at the stud exit face, said cover comprising a first portion and a second portion,
      iii. wherein said cover is constructed so that the first portion will break away from said boss to accommodate studs longer than the length of the boss, the second portion remaining formed on said boss at the stud exit face when the first portion is broken away from said boss, the second portion being disposed to project into said bore and engage the threaded stud.

6. The cable tie as claimed in claim 5 wherein the first set of fingers and the second portion of said cover engage the threaded stud at different points along its length.

7. The cable tie as claimed in claim 6 wherein the second portion of said cover is generally in the shape of a second set of fingers which are equally spaced around the circumference of the central bore.

8. A cable tie for securing a cable to a mounting surface having a threaded stud attached thereto, said cable tie comprising:

(a). an elongated strap having a first end and a second end, (b). a locking head integrally formed on the first end of said elongated strap, said locking head being adapted to cooperate with said strap to form a loop around the cable, and (c). a fastener coupled to said locking head for securing said cable to the mounting surface, said fastener comprising:

i. a boss having a stud entry face, a stud exit face and a central bore, said central bore being sized and shaped so as to enable the threaded stud to extend therein, ii. a first set of fingers formed on said boss, said fingers being disposed to project into said bore and engage the threaded stud at a first point along its length, and ii. a cover connected to the stud exit face of said boss, said cover comprising a second set of fingers formed on said boss, a center member and a plurality of thin connective legs, one leg projecting radially inward from each one of the second set of fingers and terminating into the center member.

9. The cable tie as claimed in claim 8 wherein said cover is constructed so that at least a portion thereof will break-away from said boss to accommodate studs which have a length longer than the length of the boss.

10. The cable tie as claimed in claim 9 wherein said cover is constructed so that when a portion thereof breaks away from said boss to accommodate studs which have a length longer than the length of the boss, the second set of fingers project into said bore and engage the threaded stud.

11. The cable tie as claimed in claim 10 wherein said cover is constructed so that the center member and the plurality of thin connective legs break away from said boss to accommodate studs which have a length longer than the length of the boss.

12. The cable tie as claimed in claim 11 wherein the first set of fingers and the second set of fingers engage the threaded stud at different points along its length.

\* \* \* \* \*